Aug. 23, 1938.  A. M. HARVEY  2,127,867
METHOD OF FORMING POROUS BODIES
Filed March 26, 1936

INVENTOR
Allen M. Harvey.

Parker, Prochnow & Farmer
ATTORNEYS

Patented Aug. 23, 1938

2,127,867

UNITED STATES PATENT OFFICE 2,127,867

METHOD OF FORMING POROUS BODIES

Allen M. Harvey, Olean, N. Y.

Application March 26, 1936, Serial No. 71,003

5 Claims. (Cl. 25—156)

This invention relates to methods of forming porous bodies, such as may, for example, be used as sound absorbing material and as a surface covering for walls.

One of the objects of this invention is to provide a process whereby a porous material of this kind may be formed of a clay or ceramic substance which when burned, will be thoroughly vitrified and consequently, fire-proof, and free from deterioration, decay and the like. Another object of this invention is to provide a novel method of producing a material in the form of a porous block or panel having a high sound absorbing co-efficient. Another object is to produce a body of ceramic material which is of uniform porosity and in which the pores are all connected with a surface thereof, the pores adjacent to the surface opening directly on said surface and the inner pores being connected with other pores located nearer to said surface, to permit access through successive pores into the interior of the body. Another object is to provide an improved process of forming a porous body with connecting pores or cavities, by subjecting a plastic body of a mixture of combustible granules and a clay to gradually increasing temperatures to cause the combustible granules to burn successively from an exterior surface of the body to the opposite surface thereof. Other objects of the invention will be apparent from the following description and claims.

Figure 1:
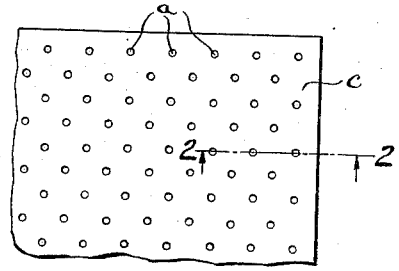
Fig. 1 is a face view of a corner portion of an acoustic body made in accordance with my improved process.

Briefly stated, the product formed in accordance with this process is a body, such as a block, slab or panel of ceramic material of an extremely porous nature having a large number of pores or cavities therein, those cavities lying nearest to the surface of the body to be exposed on the face of a wall having openings or passages extending through this surface, and the voids or cavities located at greater distances from the exposed surface of the block or panel being connected through other cavities or voids with the exposed surface. These connected voids or cavities in the panel have been found to possess high sound absorbing properties and the resulting product being of a vitrified ceramic material is of uniformly dense fire-proof and moisture-proof nature, which will not deteriorate with age, and which can be readily kept clean in any ordinary manner, such for example as washing, or by means of a suction cleaner. The voids or pores in the ceramic material are formed by initially mixing a ceramic clay and granules of combustible material, such for example as cork, which not only burns to form hollow cells or pores in the ceramic material, but also generates sufficient gas or vapor when exposed to heat to cause the walls or films of ceramic material surrounding such granules of combustible material to become broken at portions thereof leading to the outer surface of the panel or block, thus forming the connecting passages between the various pores or cavities in the panel.

In order to form blocks or panels of this kind, the cavity or pore forming material of the correct particle size to form the pores or cavities of the desired size in the finished product is thoroughly mixed with a suitable ceramic substance, such as a clay. Preferably the pore forming granules are first thoroughly mixed with dry clay and then enough water is added to create a plastic mass which is capable of retaining any desired shape. The shaping of the plastic mass can be accomplished in any suitable manner, preferably either by molding or by extruding the same. The extruding of the material is perhaps the least expensive, and since extruding apparatus are commonly used in the clay industry in connection with the manufacture of tile, brick and other articles, no detailed description of such apparatus is deemed necessary. The extruding device is provided with a die, the aperture through which is of the desired cross sectional shape, approximately the desired cross sectional shape of the finished panels, and the extruded material is cut into pieces of the desired length. This step of the process may be similar to that used in the manufacture of brick.

The pore or cavity forming material may be of any suitable composition having the properties of burning when exposed to higher temperatures and of forming sufficient gas during combustion to cause the pressure of gas in any cavity to rupture the wall of the cavity at the point of least resistance. A number of organic materials capable of performing these functions are available, such as materials of a carboniferous nature, including peat, lignum, bitumen, asphalt and the like; materials of animal origin, such as bone, leather, and the like; or materials of vegetable origin, such as wood pulp, bark, saw dust and the like. Cork has been successfully used and is desirable because it burns at relatively low temperatures and generates sufficient gas when burned, and also during the mixing of the cavity forming material with clay and water, the cork is relatively impervious to water. It will be understood, however, that it is not intended to limit this invention to the use of cork.

The combustible material is preferably selected as to size and this selection may be made in accordance with the nature of the sound to be dampened or in accordance with other conditions that may be encountered. I have found that when using cork granules, very satisfactory results can be obtained if the granules are of such size as to pass through a No. 12 mesh screen and to be retained on a No. 20 mesh screen, both mesh sizes being United States Bureau of Standards mesh sizes. It is, of course, not intended to limit this invention to the particular sizes of granules stated.

Any suitable ceramic clays may be employed, those possessing inherent plasticity being preferred. Natural clays or mixtures of clays found in different localities may be employed. Clays such as are suitable for the manufacture of vitrified tile have been found very satisfactory for use in connection with my improved process. The typical natural ball clays possess the desired properties. Such ball clays contain largely silica and alumina and when burned are of a hard structure which is impervious to moisture.

If porous bodies of various colors are desired, any suitable coloring material or materials may be mixed with the clay, such as metallic oxides of the kind commonly employed in the ceramic industry to produce the desired colors of the ultimate product.

The ingredients of the material may be mixed in various proportions. It is, however, desirable, in order to produce the maximum sound absorbing effect, to incorporate in the mixture the maximum amount of pore forming material, without, however, sacrificing the necessary strength of the resulting blocks or panels. I have found that from 80% to 85% by volume of pore forming material of the correct particle size and from 20% to 15% of clay produce a very satisfactory product, but changes in these proportions may, of course, be made, depending upon the characteristics of the ultimate product which may be desired and upon the nature of the pore forming materials used. The clay in dry form is thoroughly mixed with the pore forming material and water is then added, as has already been described. The resulting mixture may then be passed through an extruding machine or may be molded into the desired form, whereupon the material is ready to be burned.

By using a large proportion of pore forming material and a small proportion of clay, the wall or film of clay which surrounds each granule of pore forming material will be thin, so that it can readily be broken or ruptured at the portion of least resistance during burning by the vapor or gaseous products of combustion generated by the combustible pore forming material.

Figure 3:
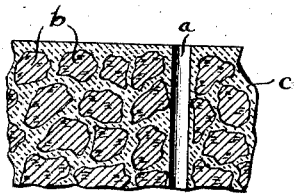
Fig. 3 is a fragmentary enlarged sectional view of a molded plastic substance formed into a block or panel and ready to be fired in an oven or kiln.

Under certain conditions, it may be desirable to form in the blocks or panels while in plastic condition, apertures or channels extending from an outer surface of the body into the interior thereof. Such channels may readily be formed by means of a suitable die or punch having a plurality of pins which are forced into the block or panel while in plastic form without, however, entirely penetrating through the same. Such apertures or channels are shown at $a$ in the drawing, in which $b$ represents the granules of combustible pore forming material, and $c$ the clay or ceramic material surrounding the same. Fig. 3 represents a section of the formed plastic material which is ready to be exposed to heat in a suitable kiln or furnace.

As the plastic mixture of pore forming material and clay is forced through the extruding machine, or if the same is formed in a mold, a thin skin or film of clay is formed on these surfaces of the plastic mass which are formed by contact with the extruding die or with the surfaces of the mold. This skin or film is always present when the extruding or molding process is used, and results in effectively sealing in the pore forming material. When the molding process is used, the formation of such a skin or film on the surface to be exposed to sound waves may be prevented by covering the corresponding surface of the mold with a layer of organic material similar to the material used for forming the pores in the sound absorbing material. In view of the following manner of firing or heating the material, it is, however, not necessary to prevent the formation of such a film on any surface of the plastic material, since when treated in accordance with my process, the gases formed by the pore forming material, readily burst through such film forming numerous small openings or holes in such surface connecting with the cavities in the body of material.

Figure 2:
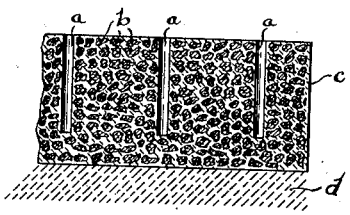
Fig. 2 is a section thereof on line 2—2, Fig. 1, and on an enlarged scale, but before heat has been applied thereto.

The burning of the material in accordance with my process must be carried on so that the plastic blocks or panels are not subjected to excessive initial temperatures. The heat must be applied to the plastic material gradually so that the heat penetrates slowly into the interior of the plastic articles. This permits the gases generated by the pore forming material to leave the body of the block or panel without destroying the shape of the same. Furthermore, it is desirable that the gases force their way out of the block or panel in the direction of one face thereof. Consequently, the plastic blocks or panels are placed upon a surface which serves to insulate the opposite or underface of the block or panel from the heat of a furnace or kiln. Any suitable means may be employed for this purpose. For example, the plastic blocks or panels may be laid upon a slab $d$ Fig. 2 of previously burned clay of sufficient density to serve to temporarily insulate the adjacent surface of the plastic block or panel from the heat within the furnace. The insulating of the back or lower surface of the block or panel may, of course, be accomplished in other ways, such for example as placing the block or panel on a bed of any heat insulating material, such as powdered asbestos or the like.

Figure 4:
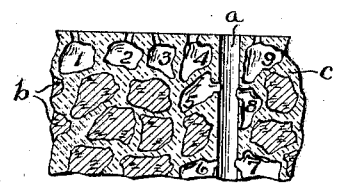
Fig. 4 is a similar sectional view, showing the same portion of a block or panel after an initial exposure to heat.
Figure 5:
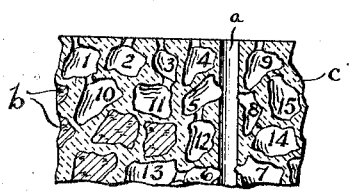
Fig. 5 is a similar sectional view, showing the block or panel after a longer period of exposure to heat.
Figure 6:
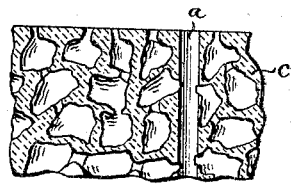
Fig. 6 is a similar sectional view showing the finished material after burning the same.

During the firing or burning of the material, the temperature of the oven or kiln must be very gradually increased. Preferably the firing of the material begins at temperatures from 140° to 160° F. and this temperature is preferably maintained for a period of about 3½ hours, after which the articles are exposed to a temperature of from 200° to 220° F. for a further period of 3½ hours, then to temperatures of from 260° to 275° F., then from 350° to 400° F., then from 425° to 475° F., and then from 525° to 650° F., about 3½ hours being required for each of these stages of temperatures. During this period of firing, the burning or oxidation of the pore forming material takes place. During the earlier portions of this period, the outer granules arranged adjacent to the exposed surface of the blocks or panels are burned and the gases or vapors generated therein burst through the outer surface of the block or panel, as clearly shown in Fig. 4. When recesses or apertures $a$ are provided in the block or panel, the heat will readily penetrate into the recesses or apertures, and consequently, as illustrated in Fig. 4, some of the pore forming material $b$ adjacent to the apertures or channels $a$ will become heated sufficiently to burst the wall of clay separating such granules from the apertures $a$. In Fig. 4, numerals 1 to 9 inclusive represent cavities formed in the plastic body by means of the particles of pore forming material adjacent to the surfaces of the blocks or panels which are exposed to heat. During further exposure of the body to heat, the heat will penetrate further into the material of the block or panel, and thus reach other granules of pore forming material located more remote from the exposed surfaces of the body, and Fig. 5 shows additional cavities 10 to 15 inclusive formed by further combustion of the pore forming material. It will be noted in Fig. 4 that each of the cavities 1 to 9 inclusive is connected by means of an opening or channel to an exposed surface of the block or panel, and in Fig. 5 it will be noted that the pores or cavities 10 to 15 inclusive have channels connecting them with adjacent cavities previously formed by the combustion of the granules contained therein. In Fig. 5, a few unburned granules of pore forming material are still present, which, however, become burned during further rise in temperature, and in Fig. 6 it will be noted that these cavities or pores, which had been occupied by the unburned particles in Fig. 5, are also connected with other cavities or pores previously formed in the block or panel.

The very gradual penetration of heat into the interior of the plastic body is also due to a large extent to the heat insulating properties of the combustible material. Consequently, heat does not penetrate into the interior of the body to any great extent until the outermost granules are burned out, whereupon heat can penetrate into the vacant cavities left by burnt out granules. This enables the next adjacent granules to burn and break the walls of clay surrounding them at the point nearest to adjacent vacant cavities, so that the burning out of the granules of combustible material progresses gradually into the interior of the body and toward the face thereof nearest to the heat insulating support $d$.

In order to complete the formation of my improved sound absorbing vitrified material, the same is gradually subjected to increasing temperature at regular and desired time intervals until temperatures of approximately 2000° F. or more are reached, whereupon the temperature within the oven or kiln is gradually reduced to a point at which the bodies may safely be removed from the kiln. During the raising of the temperature to near 2000° F., the clay becomes vitrified without any further change in the nature of the pores or cavities formed therein. The material of the block or panel, consequently, becomes hard and impervious to moisture and of a nature similar to other vitrified ceramic material, such as tile or the like. After a gradual cooling of the bodies, they can be removed from the kiln and are ready for use without further treatment. Any colors of the vitrified bodies are permanent.

Porous bodies made in accordance with my process and of a thickness of only ¾ths of an inch have been found to have about 57% efficiency in absorbing sound at a pitch of 512 vibrations per second. Since the bodies are formed at temperatures of about 2000° F., they are, of course, fire-proof, and since they consist of vitrified clay, they are also moisture proof, and can be easily cleaned by washing and, if desired, any material lodging in the cavities can be removed by a suction cleaning device. The bodies can be readily formed of any surface contour or shape, and can be quickly installed over old walls or nailed directly to wooden studs or other supports. The material may also be readily cut with a saw. It requires no decorating and the upkeep of walls or ceilings formed with this material is, consequently, negligible. The finished material is very light in weight, averaging about 3.2 pounds per square foot when of a thickness of ¾ths of an inch, thus reducing structural costs to a minimum. The thickness of the bodies of acoustic material may vary as desired, an increase in thickness being advisable where greater sound absorbing capacity is desired.

I claim as my invention:

1. A method of making porous bodies, which includes mixing 15% to 20% by volume of clay and 80% to 85% of combustible granules, adding water to the mixture to form a plastic mass, forming the mass into bodies of the shape desired, placing one face of each body upon a heat insulating support, and applying heat at gradually increasing temperatures to the opposite face of each body to form in said body a series of pores connected to said opposite face thereof by passages formed by gas pressure resulting from the combustion of said granules.

2. A method of making porous bodies, which includes forming with water a plastic mixture of from 15% to 20% by volume of clay and 80% to 85% of granular combustible material, the particle size of which is approximately such that the material passes through a twelve mesh screen and is retained by a twenty mesh screen, mixing the ingredients to form thin webs of clay about said granules, forming the mass into bodies of the shape desired by extruding the same under pressure and heating said bodies while still wet and in plastic condition at gradually increasing temperatures to cause the granules adjacent to the surfaces of the bodies to generate sufficient gas to burst through the outer surfaces of said bodies, and then to cause granules further removed from the surface to generate sufficient gas to burst their enclosing webs into cells which have already been burst, to form connecting passages with adjacent cells to form a series of connecting cells communicating with the surface of the body.

3. The method of making porous bodies, which includes forming a plastic mixture of 15% to 20% by volume of clay and 80% to 85% by volume of cork granules approximately of a size to pass through a twelve mesh screen and to be retained by a twenty mesh screen, forming the mass into bodies of the shape desired and heating the bodies while still wet and in plastic condition at gradually increasing temperatures to form in said bodies cells connected by passages to the exterior of the body.

4. A method of forming a slab-like porous body having front and back faces of greater area than the edge surfaces of said body, said body having a series of pores formed therein and having openings terminating in said front face of said body and in cells which in turn communicate with other cells having openings leading to said face, which comprises heating at gradually increasing temperatures a mass of clay material having granules of combustible material embedded therein, and carrying on said heating while the back face of said body rests upon a heat insulating surface to cause the combustion gases of the combustible materials to form openings leading to said front face.

5. A method of forming a porous body, comprising forming a plastic mass of a mixture of granules of combustible material with relatively small volume of clay, metallic coloring material and water, shaping said mass into the form desired with front and back faces of greater area than the edge faces thereof, subjecting the front face of the shaped body to successive and gradual increases in temperature in excess of those to which the back face is subjected to cause the combustion of granules embedded in said clay material adjacent said front face to form gases, continuing the gasifying of said combustion material successively toward the interior of said body from the front face thereof to the back face, the granules of combustible material generating gases in cells occupied by the granules and bursting the walls of said cells and upon combustion permitting heat to penetrate through pores thus formed to adjacent granules farther removed from the front face of the body to which the heat is applied, and then subjecting the remaining clay material to temperatures sufficient to vitrify the same.

ALLEN M. HARVEY.